(12) United States Patent
Newbery et al.

(10) Patent No.: US 8,066,010 B2
(45) Date of Patent: Nov. 29, 2011

(54) THERMALLY INSULATIVE SMOKING ARTICLE FILTER COMPONENTS

(75) Inventors: Piers Newbery, Davis, CA (US); Antonis Tsakotellis, Neuchatel (CH); Susan E. Plunkett, Richmond, VA (US); Kenneth H. Shafer, Sutherland, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 12/987,824

(22) Filed: Jan. 10, 2011

(65) Prior Publication Data
US 2011/0100384 A1    May 5, 2011

Related U.S. Application Data

(62) Division of application No. 11/104,638, filed on Apr. 13, 2005, now Pat. No. 7,878,209.

(51) Int. Cl.
A24B 15/18    (2006.01)

(52) U.S. Cl. ............. 131/334

(58) Field of Classification Search ............ None
See application file for complete search history.

(56) References Cited

U.S. PATENT DOCUMENTS

| | | |
|---|---|---|
| 4,195,649 A | 4/1980 | Noguchi et al. |
| 4,700,723 A | 10/1987 | Yoshikawa et al. |
| 4,772,508 A | 9/1988 | Brassell |
| 4,966,171 A | 10/1990 | Serrano et al. |
| 5,211,684 A | 5/1993 | Shannon et al. |
| 5,322,075 A | 6/1994 | Deevi et al. |
| 5,499,636 A | 3/1996 | Baggett, Jr. et al. |
| 5,502,019 A | 3/1996 | Augustine et al. |
| 5,568,819 A | 10/1996 | Gentry et al. |
| 5,591,368 A | 1/1997 | Fleischhauer et al. |
| 5,595,577 A | 1/1997 | Bensalem et al. |
| 5,666,976 A | 9/1997 | Adams et al. |
| 5,692,525 A | 12/1997 | Counts et al. |
| 5,692,526 A | 12/1997 | Adams et al. |
| 5,827,355 A | 10/1998 | Wilson et al. |
| 5,915,387 A | 6/1999 | Baggett, Jr. et al. |
| 5,934,289 A | 8/1999 | Watkins et al. |
| 5,988,176 A | 11/1999 | Baggett, Jr. et al. |
| 6,030,698 A | 2/2000 | Burchell et al. |

(Continued)

FOREIGN PATENT DOCUMENTS

EP    0826532 A2    3/1998

(Continued)

OTHER PUBLICATIONS

Wei, George C. et al., "Carbon-Bonded Carbon Fiber Insulation for Radioisotope Space Power Systems", Ceramic Bulletin, vol. 64, No. 5 (1985), pp. 691-699.

(Continued)

*Primary Examiner* — Richard Crispino
*Assistant Examiner* — Michael J Felton
(74) *Attorney, Agent, or Firm* — Buchanan Ingersoll & Rooney PC

(57) ABSTRACT

A filter component includes a catalyst surrounded by a thermally insulative carbon fiber composite. The catalyst can catalyze the chemical reaction of selected gaseous constituents of a gas stream. During catalysis, the catalyst can reach high temperatures. The carbon fiber composite can contain heat generated during the catalysis within the filter component and thereby reduce heat transfer to the surroundings. The filter component can be used in smoking articles. Methods of making and using the filter-component and methods for treating mainstream tobacco smoke are also provided.

11 Claims, 15 Drawing Sheets

U.S. PATENT DOCUMENTS

| | | |
|---|---|---|
| 6,053,176 A | 4/2000 | Adams et al. |
| 6,344,239 B1 | 2/2002 | Asai et al. |
| 6,761,174 B2 | 7/2004 | Jupe et al. |
| 6,769,437 B2 | 8/2004 | Hajaligol et al. |
| 6,782,892 B2 | 8/2004 | Li et al. |
| 7,878,209 B2 | 2/2011 | Piers et al. |
| 2003/0000538 A1 | 1/2003 | Bereman |
| 2003/0075193 A1 | 4/2003 | Li et al. |
| 2003/0131859 A1 | 7/2003 | Li et al. |
| 2003/0200973 A1 | 10/2003 | Xue et al. |
| 2004/0007241 A1 | 1/2004 | Li et al. |
| 2004/0025895 A1 | 2/2004 | Li et al. |
| 2004/0110633 A1 | 6/2004 | Deevi et al. |
| 2004/0129280 A1 | 7/2004 | Woodson et al. |
| 2004/0194792 A1 | 10/2004 | Zhuang et al. |
| 2004/0250654 A1 | 12/2004 | Pithawalla et al. |
| 2004/0250825 A1 | 12/2004 | Deevi et al. |
| 2004/0250827 A1 | 12/2004 | Deevi et al. |

FOREIGN PATENT DOCUMENTS

| | | |
|---|---|---|
| WO | WO03/086116 A1 | 10/2003 |

OTHER PUBLICATIONS

International Search Report and Written Opinion mailed Aug. 2, 2006 for PCT/IB2006/001434.

International Preliminary Report on Patentability mailed Oct. 25, 2007 for PCT/IB2006/001434.

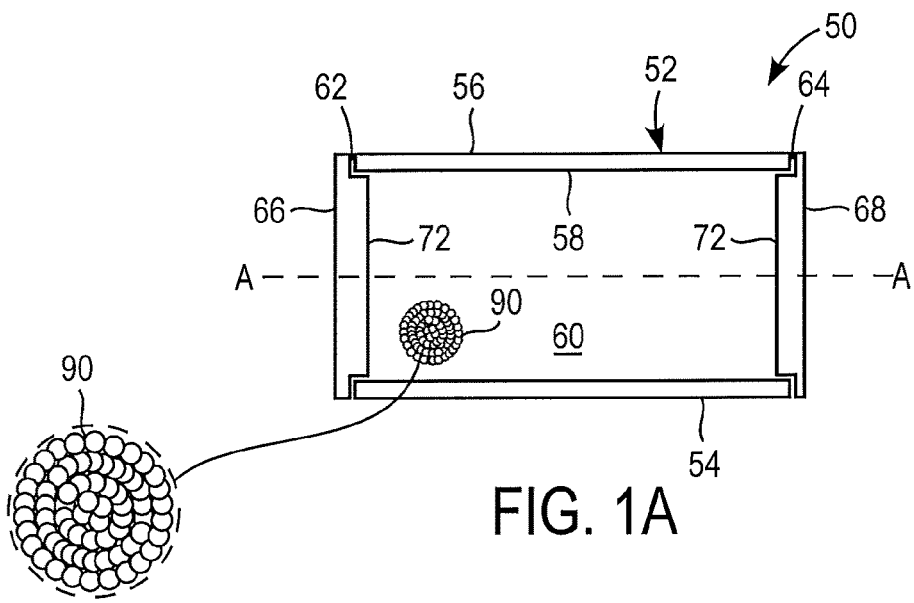
FIG. 1A
FIG. 1B
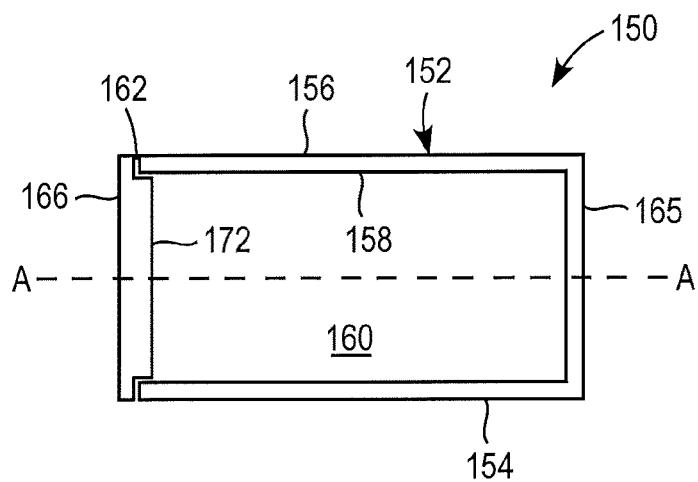
FIG. 2
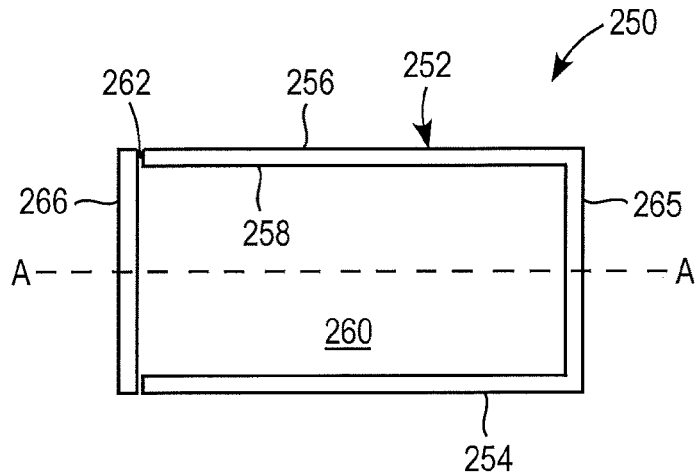
FIG. 3

THERMALLY INSULATIVE SMOKING ARTICLE FILTER COMPONENTS

This application is a divisional of U.S. patent application Ser. No. 11/104,638, entitled THERMALLY INSULATIVE SMOKING ARTICLE FILTER COMPONENTS, filed on Apr. 13, 2005 now U.S. Pat. No. 7,878,209, the entire content of which is hereby incorporated by reference.

BACKGROUND

A catalyst is a substance that can accelerate the rate of certain chemical reactions, but without being consumed or undergoing a chemical change itself.

Chemical reactions that occur with the evolution of heat to the surroundings are called exothermic reactions, and have a negative enthalpy change, i.e., $\Delta H<0$. Chemical reactions that occur with the absorption of heat from the surroundings are called endothermic reactions, and have a positive enthalpy change, i.e., $\Delta H>0$.

SUMMARY

Smoking article filters useful for catalyzing the chemical reaction of one or more selected constituents of mainstream tobacco smoke are provided. In a preferred embodiment, the filter comprises a filter component, which includes a porous carbon-bonded carbon fiber composite containing a catalyst. The catalyst is preferably located in one or more hollow spaces provided in the carbon fiber composite, and/or distributed throughout the carbon fiber composite. The catalyst provided in the composite is effective to cause catalytic conversion via reaction of at least one constituent of mainstream tobacco smoke to an innocuous gas, e.g., the chemical reaction of carbon monoxide to carbon dioxide.

In another preferred embodiment, the carbon fiber composite is a monolithic body without a cavity and the catalyst is contained within the body of the carbon fiber composite.

The carbon fiber composite is a thermal insulator and has low thermal conductivity. The carbon fiber composite can contain heat evolved during the chemical reaction(s) within the filter component. By containing this heat, the catalyst can remain at an elevated temperature within the carbon fiber composite to enhance its catalytic performance. The carbon fiber composite preferably can also prevent excessive heat from reaching other portions of the filter that are sensitive to such heat.

In a preferred embodiment, the filter includes a flavoring-release additive, which includes flavoring disposed downstream from the carbon fiber composite. The flavoring-release additive can have a selected minimum flavoring-release temperature. Heat that is evolved during one or more chemical reactions catalyzed by the catalyst can be transferred to the flavoring-release additive via the mainstream smoke and utilized to heat the flavoring-release additive to at least the minimum flavoring-release temperature, thereby causing release of the flavoring in the filter.

A preferred embodiment of a method of making a filter comprises incorporating into a filter component including a carbon fiber composite a catalyst effective to catalyze the chemical reaction of at least one selected gaseous constituent of mainstream smoke.

A preferred embodiment of a method of making a cigarette comprises placing a paper wrapper around a tobacco column to form a tobacco column, and attaching a cigarette filter to the tobacco column to form the cigarette. The cigarette filter includes a filter component having a porous carbon-bonded carbon fiber composite containing a catalyst that can catalyze the chemical reaction of at least one selected gaseous constituent of mainstream smoke passing through the filter. The filter component can optionally also include a flavoring-release additive.

A preferred embodiment of a method of treating mainstream tobacco smoke comprises heating or lighting a cigarette to form smoke, and drawing the smoke through the cigarette such that the catalyst contained in the carbon fiber composite catalyzes the chemical reaction of at least one selected gaseous constituent of mainstream smoke. The cigarette can be a traditional or a less-traditional cigarette, such as a cigarette of an electrical heated cigarette smoking system or a cigarette that contains a combustible heat source.

BRIEF DESCRIPTION OF THE DRAWING FIGURES

FIG. 1A depicts an embodiment of a carbon-bonded carbon fiber composite including two open ends closed by covers.

FIG. 1B is an enlarged view of catalyst material contained in the carbon-bonded carbon fiber composite shown in FIG. 1A.

FIG. 2 depicts another embodiment of the carbon-bonded carbon fiber composite including a single open end and cover.

FIG. 3 depicts another embodiment of a carbon-bonded carbon fiber composite including a single open end closed by an alternative cover configuration.

Figure 15:
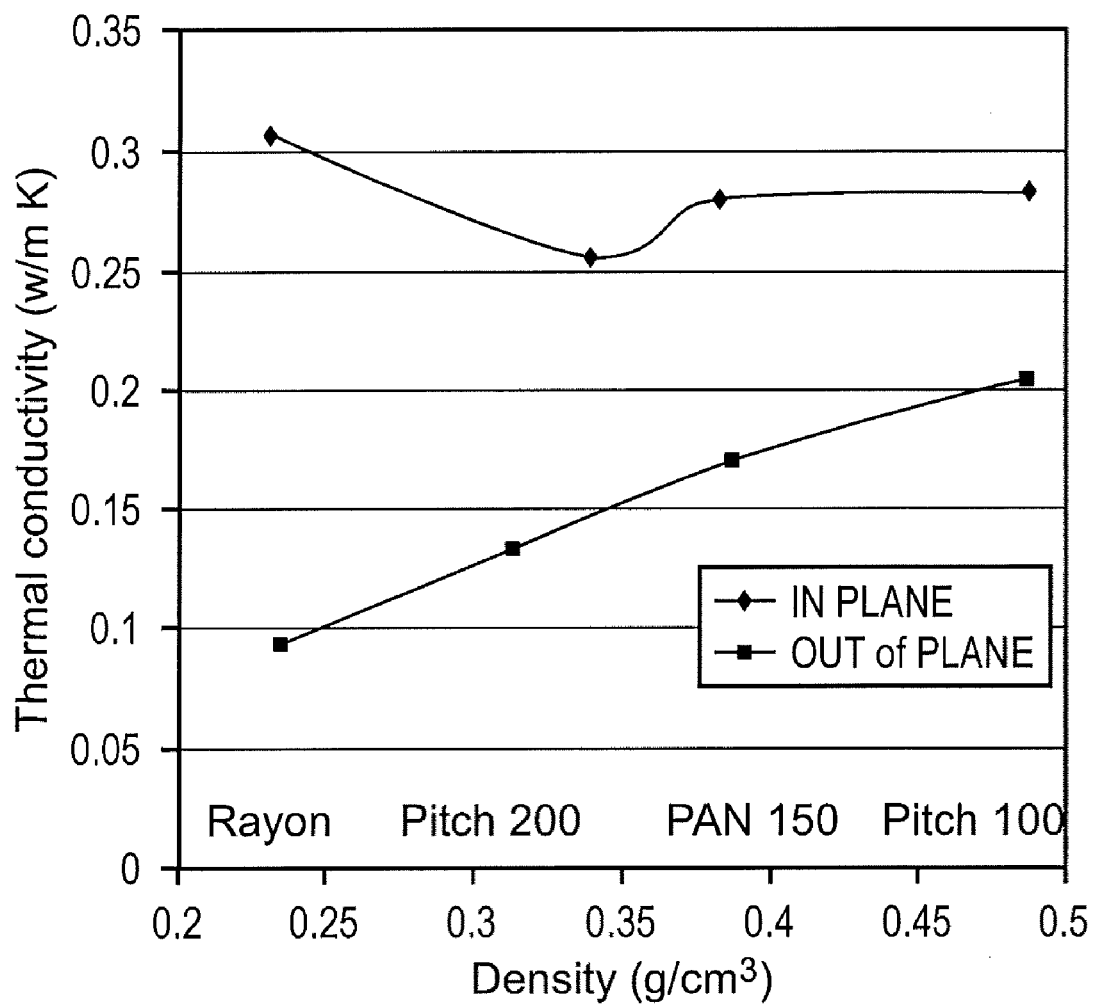

FIG. 15 shows the thermal conductivity versus density for four carbon-bonded carbon fiber composites respectively including different types of carbon fibers which extend along the longitudinal axis of the composite (i.e., "in-plane"), and for four carbon-bonded carbon fiber composites also respectively including different types of carbon fibers, but which extend orthogonal to the longitudinal axis of the composite (i.e., "out-of-plane").

Figure 16:
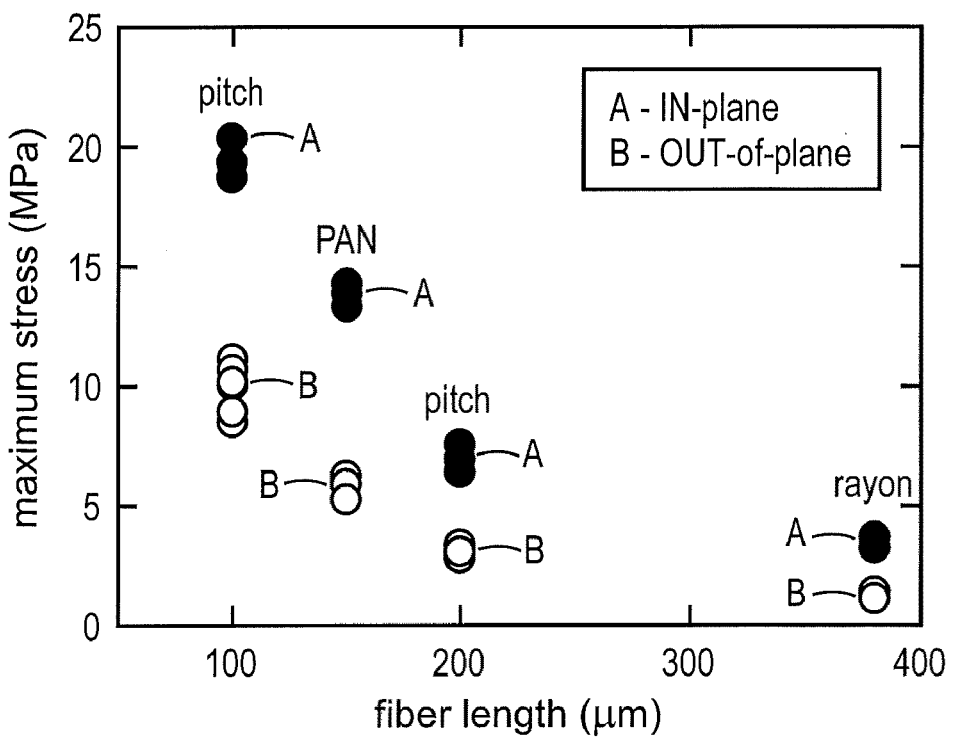

FIG. 16 depicts the maximum compressive stress applied before failure for carbon fiber composites including carbon fibers having lengths of about 100 μm (pitch fibers), about 150 μm (PAN fibers), about 200 μm (pitch fibers) and about 380 μm (rayon fibers), where the carbon fibers are oriented either "in-plane" or "out-of-plane."

Figure 17:
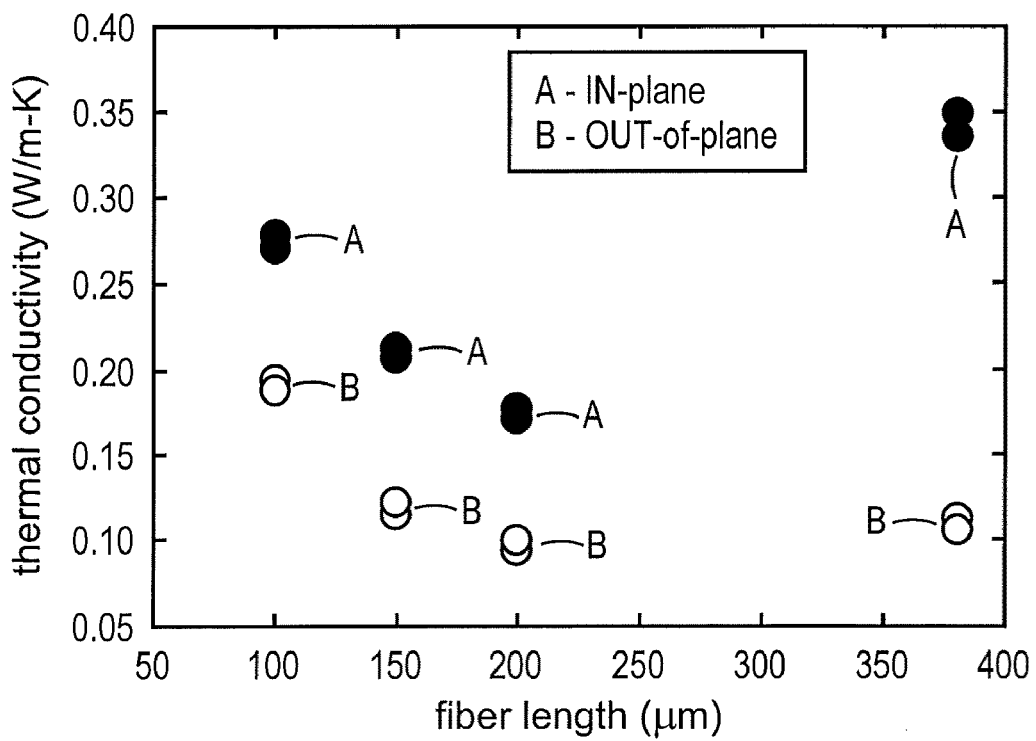

FIG. 17 depicts the thermal conductivity versus carbon fiber length for carbon fiber composites including carbon fibers having lengths of about 100 μm (pitch fibers), about 150 μm (PAN fibers), about 200 μm (pitch fibers) and about 380 μm (rayon fibers), where the carbon fibers are oriented either "in-plane" or "out-of-plane."

Figure 18:
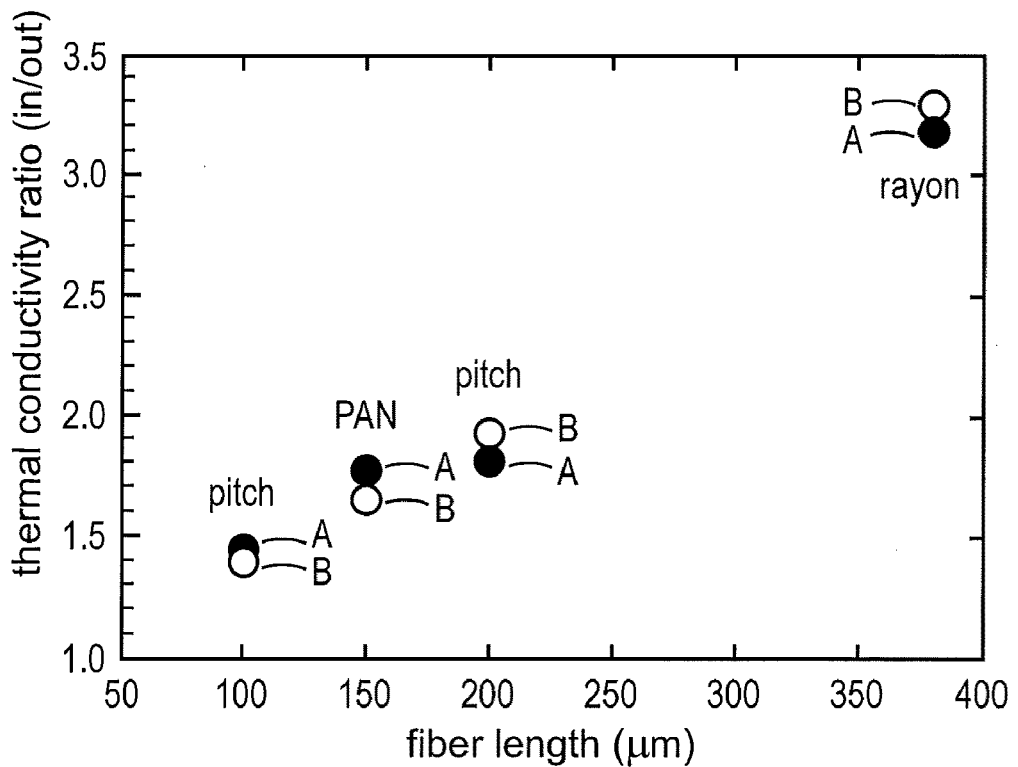

FIG. 18 depicts the thermal conductivity ratio, i.e., the ratio of the in-plane thermal conductivity to the out-of-plane thermal conductivity, for carbon fiber composites including carbon fibers having lengths of about 100 μm (pitch fibers), about 150 μm (PAN fibers), about 200 μm (pitch fibers) and about 380 μm (rayon fibers), where the carbon fibers are oriented either "in-plane" or "out-of-plane."

Figure 19:
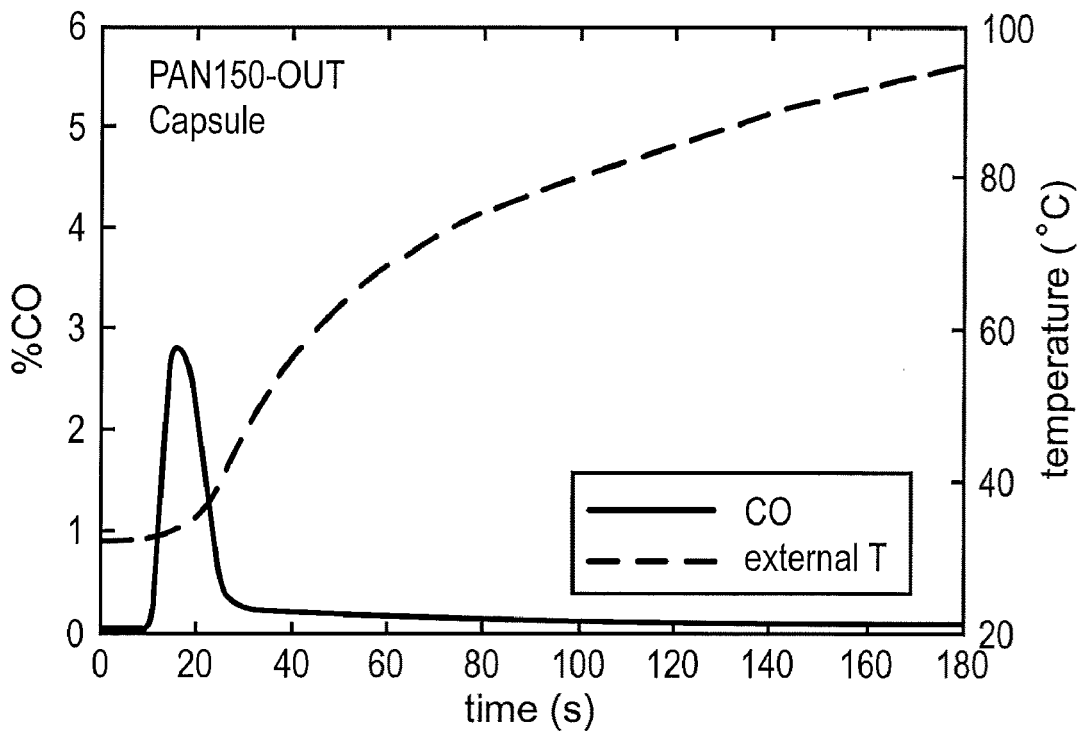

FIG. 19 depicts the change with respect to time of (a) the CO content of gas passed through a tubular, porous, carbon-bonded carbon-fiber composite containing Co-based oxide catalyst material, and (b) the external temperature of the composite, as a function of passing $N_2$-10% $O_2$—WACO gas through the composite.

Figure 20:
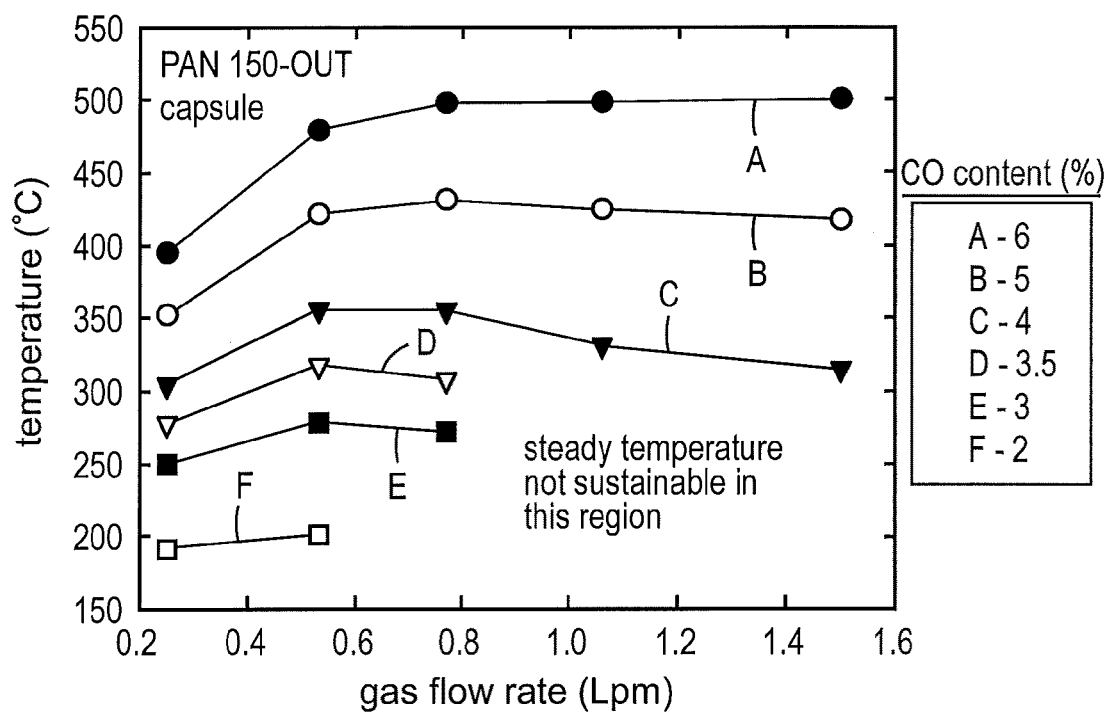

FIG. 20 depicts the relationship between the catalyst temperature and the gas flow rate for $N_2$-10% $O_2$—CO gas mixtures having different CO contents flowed through a carbon-bonded carbon fiber composite.

Figure 21:
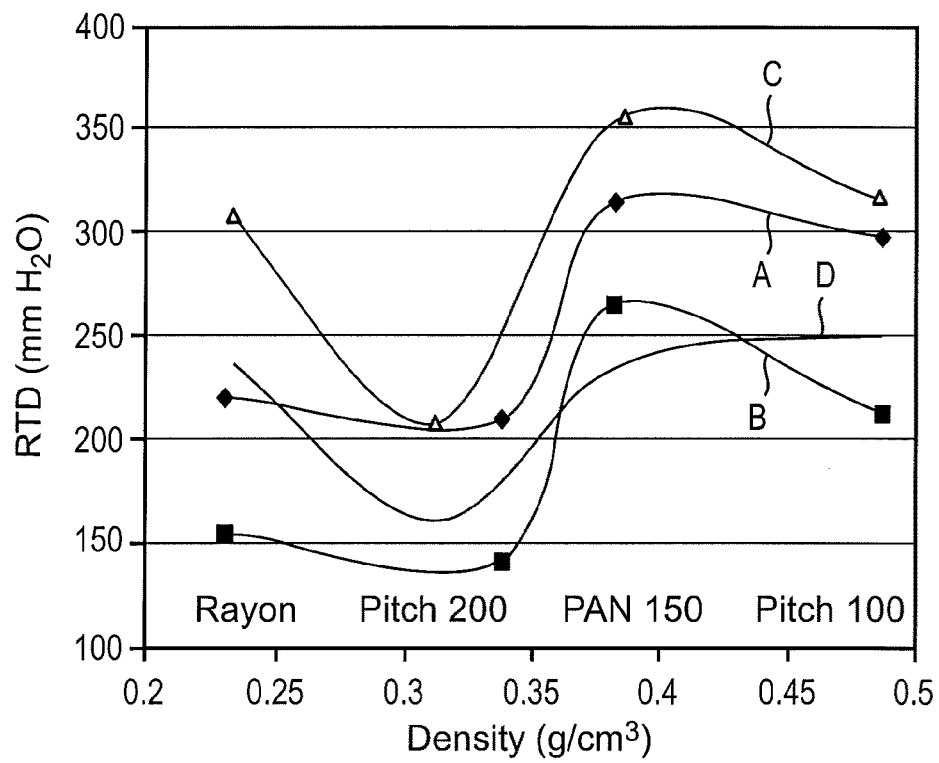

FIG. 21 shows the relationship between the RTD (resistance to draw) and carbon-bonded carbon fiber composite density for composites including four different types of carbon fibers, where the body and the cover of the composite both include the same type of carbon fiber.

Figure 22:
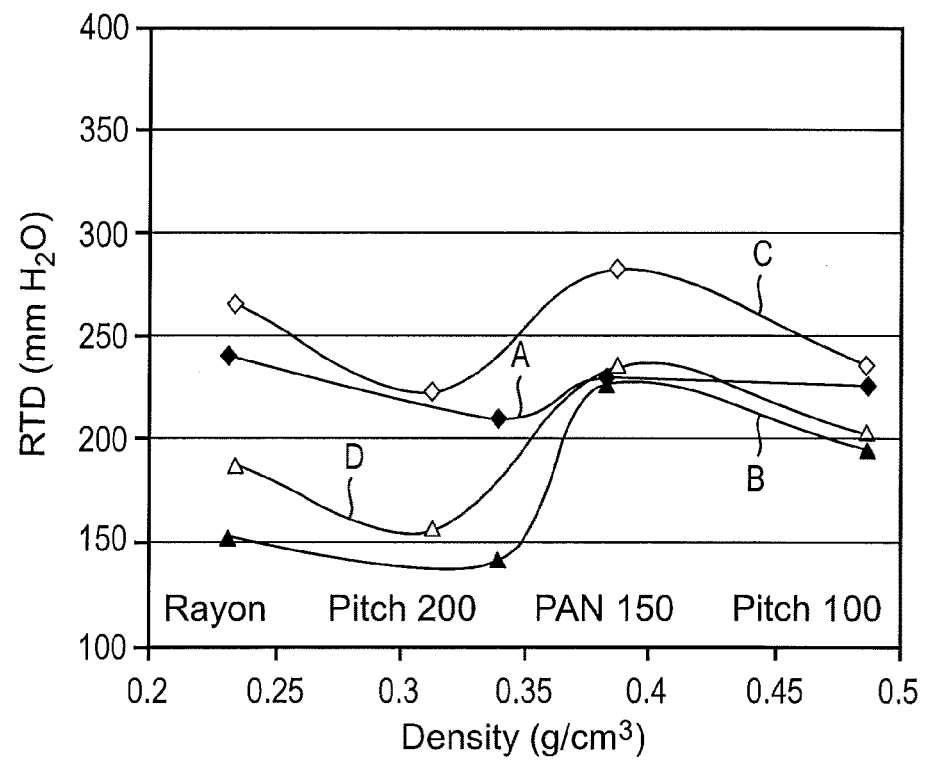

FIG. 22 shows the relationship between the RTD and carbon-bonded carbon fiber composite density for composites produced using four different types of carbon fibers, where the body and the cover of the composites include different types of carbon fibers.

Figure 23:
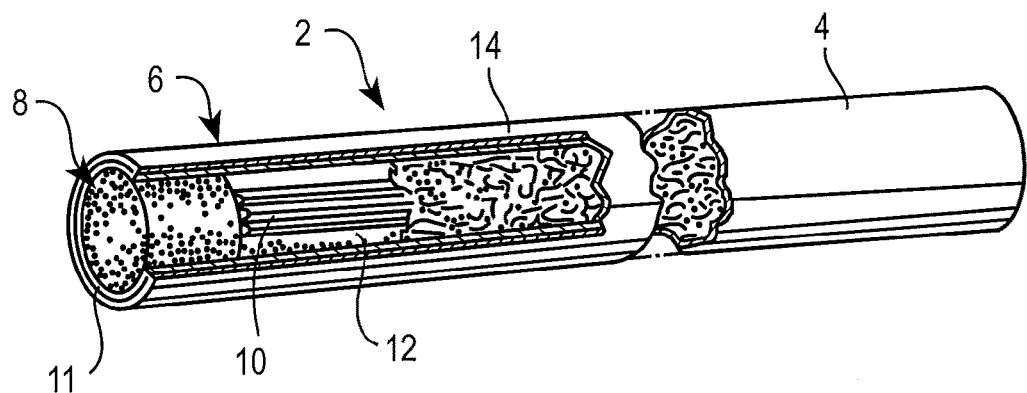

FIG. 23 illustrates an exemplary cigarette including a tubular filter element.

Figure 24:
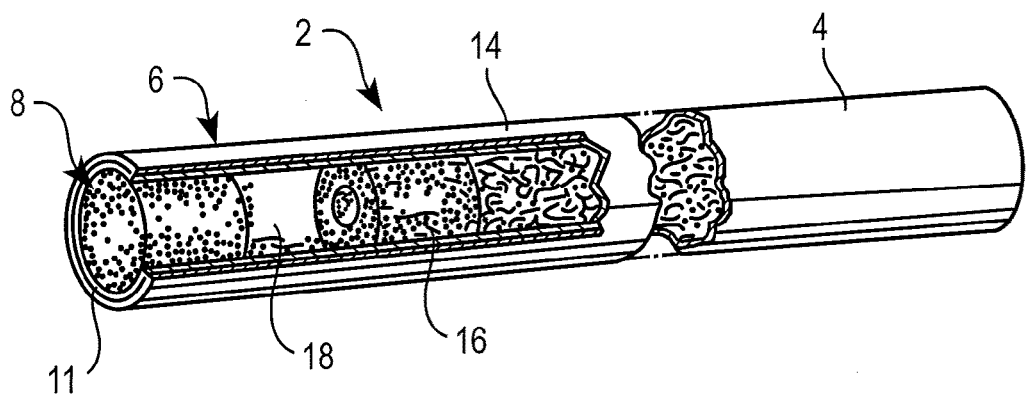

FIG. 24 illustrates an exemplary cigarette including a plug-space-plug filter element.

Figure 25:
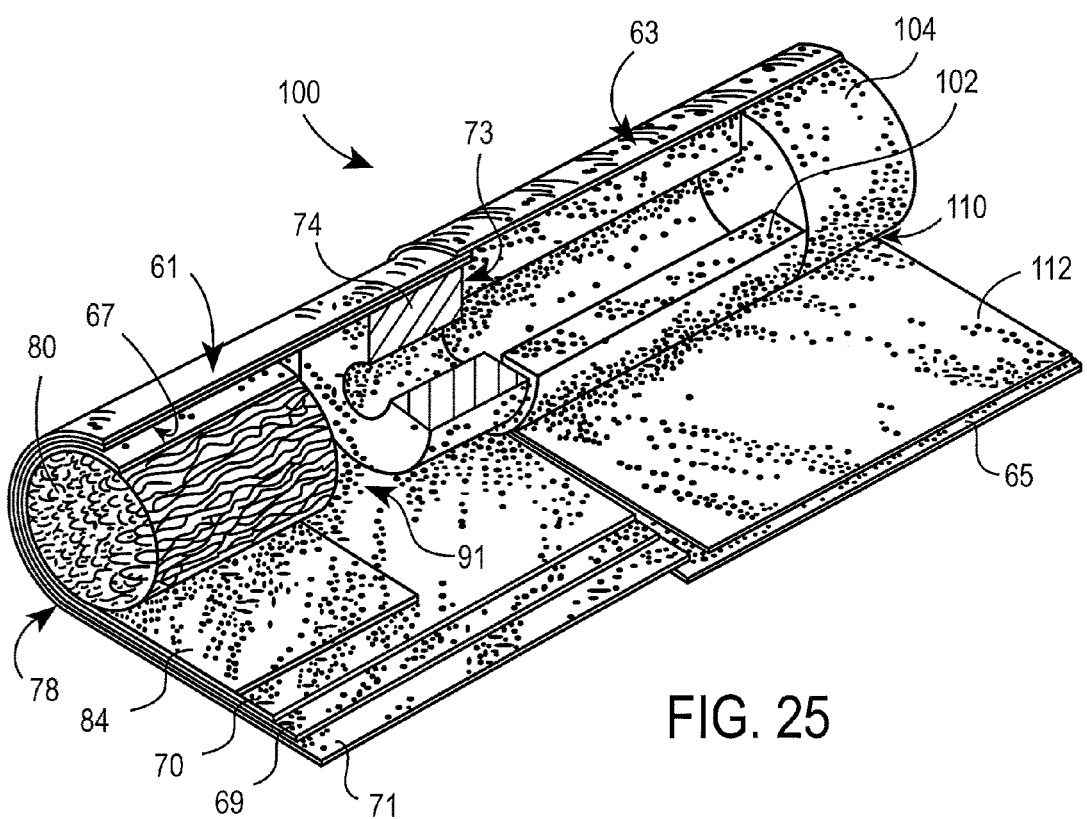

FIG. 25 illustrates an exemplary cigarette for an electrical smoking system.

DETAILED DESCRIPTION

Smoking article filter components are provided that include a thermally insulative, porous carbon-bonded carbon fiber composite containing catalyst material. The catalyst material is effective to catalyze the chemical reaction of at least one gaseous constituent of tobacco smoke passing through the composite.

The chemical reaction(s) that occur in the smoking article can be exothermic and evolve a large quantity of heat. Such chemical reactions cause the temperature of the catalyst to increase significantly in the smoking article. The carbon-bonded carbon fiber composite is a thermal insulator that can substantially contain heat that is evolved by chemical reaction(s) that occur within the composite. Consequently, heating of the outer surface of the composite and its surroundings in the smoking article can be controlled. In addition, because the composite is a thermal insulator, the catalyst contained in the composite is able to operate in an elevated-temperature environment, which enhances its catalytic performance.

The smoking article filter components are useful for various smoking articles, e.g., cigarettes, pipes, cigars and non-traditional cigarettes.

As used herein, the term "sorption" denotes filtration by absorption and/or adsorption. "Sorption" includes interactions on the outer surface of the sorbent, as well as interactions within the pores and channels of the sorbent. In other words, a "sorbent" is a substance that can condense or hold molecules of other substances on its surface, and/or take up other substances, i.e., through penetration of the other substances into its inner structure, or into its pores. As used herein, a "sorbent" refers to an adsorbent, an absorbent, or a substance that can perform both of these functions.

As described herein, "mainstream smoke" includes the mixture of gases, solid particles and aerosol that passes down the smoking article and issues through the filter or mouth end, i.e., the smoke that issues or is drawn from the mouth end of a smoking article during smoking. Mainstream smoke includes air that is drawn in through both the lit region of a smoking article, as well as air drawn through the paper wrapper in a cigarette.

FIG. 1A illustrates a preferred embodiment of a filter component 50 including a porous, carbon-bonded carbon fiber composite 52. The carbon fiber composite 52 includes a tubular body 54 having an outer surface 56, an inner surface 58 defining a cavity 60 and opposed open ends 62, 64. Two covers 66, 68 close the respective open ends 62, 64. The covers 66, 68 preferably include a portion 72 extending into the cavity 60. The portion 72 can be sized so that the covers 66, 68 can be press fit onto the body 54 to close the open ends 62, 64, respectively. As described below, a catalyst material 90 occupies at least a portion of the cavity 60, and preferably substantially the entire volume of the cavity 60 (i.e., excluding the space between the catalyst particles). FIG. 1B is an enlarged view of the catalyst 90 shown in detail in FIG. 1A.

A filter component 150 according to another preferred embodiment is shown in FIG. 2. The filter component 150 comprises a porous, carbon-bonded carbon fiber composite 152 including a body 154 having an outer surface 156 and an inner surface 158 defining a cavity 160. In the embodiment, the body 154 is tubular and includes a single open end 162 and an opposite closed end 165. A cover 166 closes the open end 162. Catalyst material occupies at least a portion of the cavity 160, preferably substantially the entire volume of the cavity 160.

A filter component 250 according to another preferred embodiment is shown in FIG. 3. The filter component 250 comprises a carbon fiber composite 252 including a body 254 having an outer surface 256, an inner surface 258 defining a cavity 260, an open end 262 and a closed end 265. A cover 266 closes the open end 262. Sufficient catalyst material is provided to occupy at least a portion of the cavity 260, preferably substantially the entire volume of the cavity 260. In an alternative embodiment, the body 254 can include two open ends and two covers.

The porous, carbon-bonded carbon fiber composite includes carbon fibers interbonded by a carbonized material and voids between the carbon fibers. The carbon fibers preferably have a length of from about 50 μm to about 400 μm, more preferably from about 50 μm to about 200 μm. The carbon fibers preferably have a diameter of from about 10 μm to about 30 μm. The carbon fiber composite preferably has a porosity of from about 50% to about 95% by volume, more preferably from about 80% to about 90% by volume, and preferably has a density of from about 0.2 g/cm³ to about 0.6 g/cm³. The structure of the carbon fiber composite immobilizes the carbon fibers, while also providing sufficiently high gas permeability for use in a smoking article. The carbon fiber composites can also provide a low thermal conductivity of from about 0.1 W/m·K to about 0.3 W/m·K.

Figure 4:
FIG. 4 is a photomicrograph showing a carbon-bonded carbon fiber composite produced from rayon fibers.
Figure 5:
FIG. 5 is a photomicrograph showing a carbon-bonded carbon fiber composite produced from pitch fibers having a length of about 100 µm.
Figure 6:
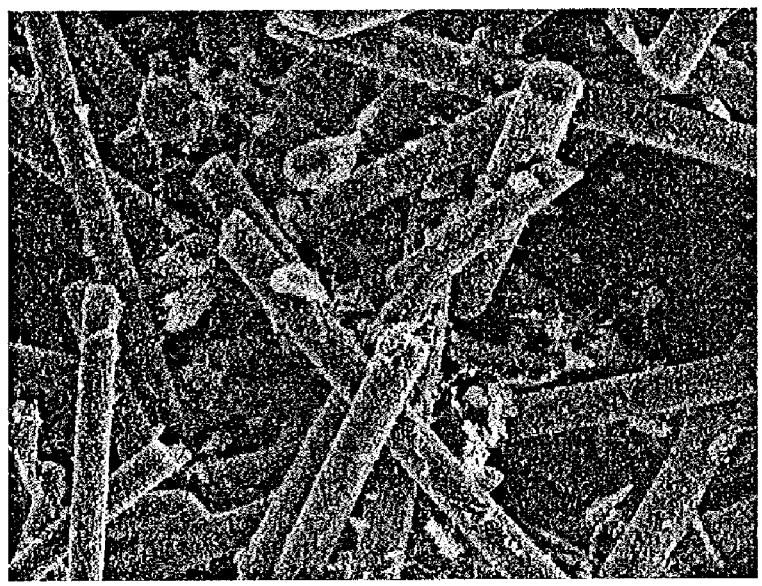
FIG. 6 is a photomicrograph showing a carbon-bonded carbon fiber composite produced from poly(acrylonitrile) (PAN) fibers.
Figure 7:
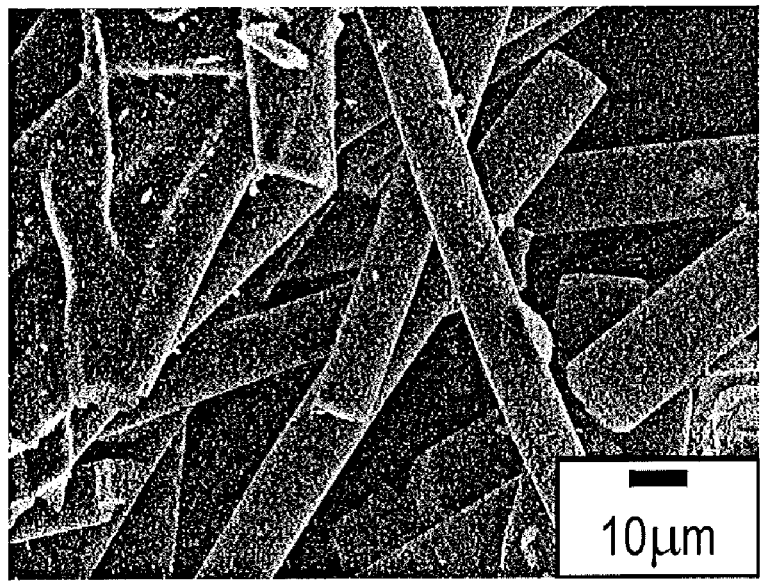
FIG. 7 is a photomicrograph showing a carbon-bonded carbon fiber composite produced from pitch fibers having a length of 200 µm.

Carbon fiber composite structures produced using different interbonded carbon fiber materials are shown in FIGS. 4-7, each taken at the same magnification. FIG. 4 shows a carbon fiber composite including rayon fibers having a length of about 380 μm; FIG. 5 shows a carbon fiber composite including pitch fibers having a length of about 100 μm; FIG. 6 shows a carbon fiber composite including poly(acrylonitrile) (PAN) fibers having a length of about 100 μm, and FIG. 7 shows a carbon fiber composite including pitch fibers having a length of about 200 μm.

Figure 8:
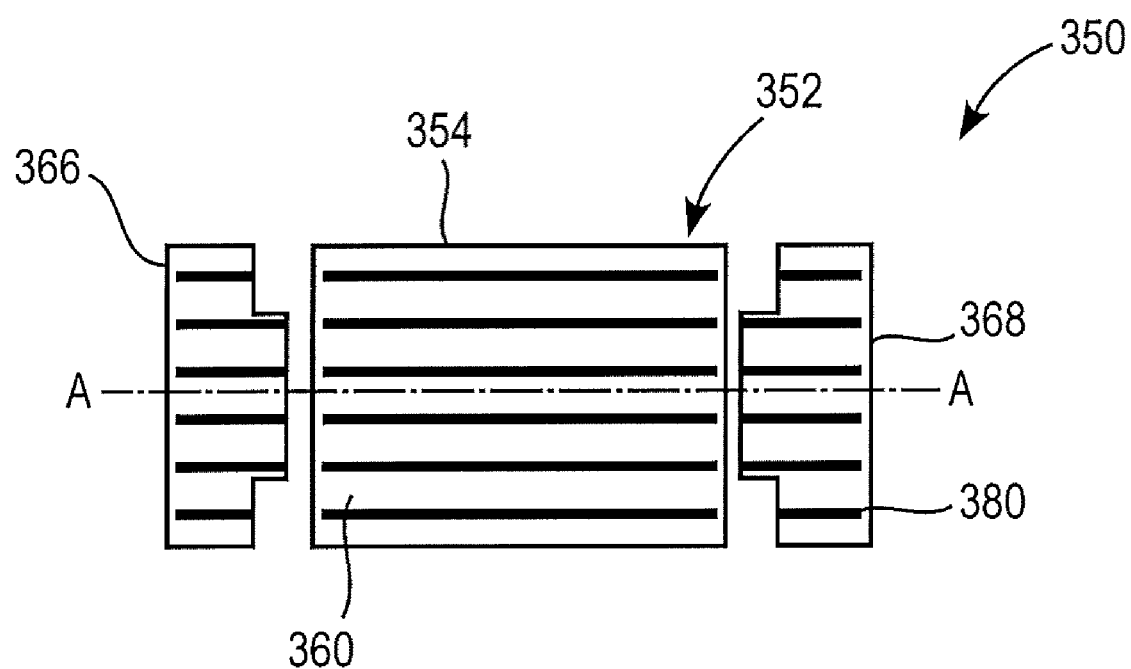
FIG. 8 is a longitudinal cross-sectional view of a carbon-bonded carbon fiber composite including a body, covers and carbon fibers lying substantially in parallel planes along the longitudinal axis A-A of the composite.

The carbon fibers contained in the carbon fiber composite preferably have a fiber orientation resulting from the process used to manufacture the composite. FIG. 8 schematically illustrates a preferred embodiment of a filter component 350 comprising a carbon fiber composite 352 including a body 354 having a cavity 360, and covers 366, 368 for closing opposed open ends of the body 354. The carbon fibers are arranged in planes 380 that lie substantially parallel to the longitudinal axis A-A of the filter component 350 in the body 354 and in the covers 366, 368.

The carbon fibers that are used to produce the carbon fiber composites have anisotropic thermal conductivity characteristics, i.e., the thermal conductivity of the carbon fiber composite is higher in a direction parallel to the planes of the carbon fibers than in other directions of the carbon fiber composite, e.g., in a direction orthogonal to the planes. Accordingly, in the filter component 350, the thermal conductivity of the carbon fibers is highest in the planes 380 extending along the longitudinal axis A-A.

Figure 9:
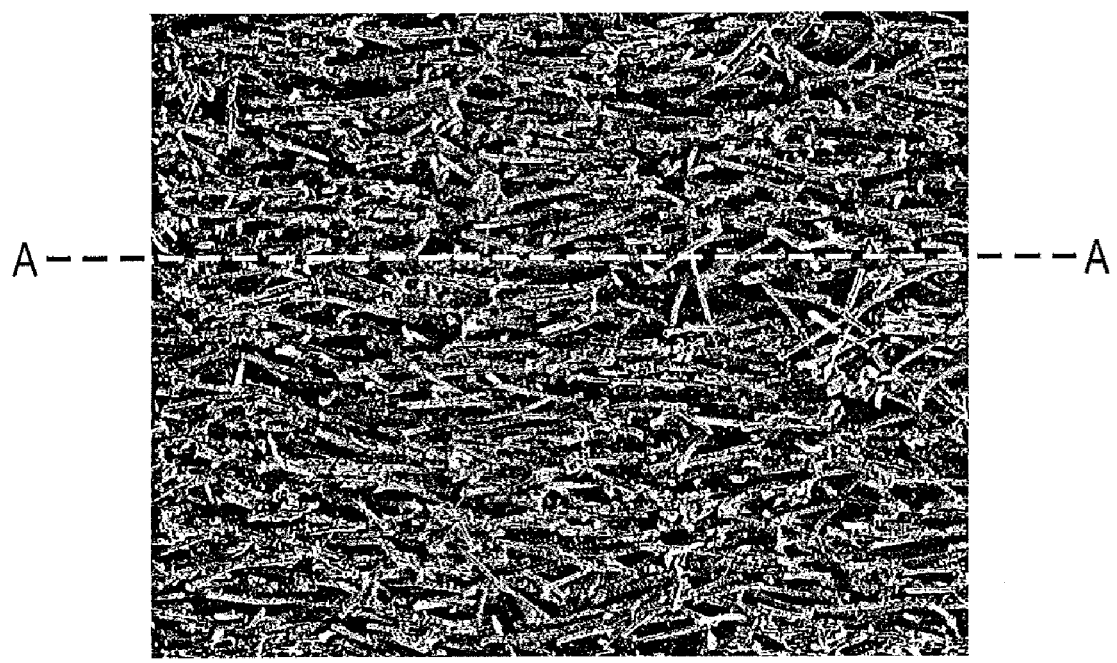
FIG. 9 is a photomicrograph of a carbon fiber composite including carbon fibers lying substantially in planes parallel to the longitudinal axis.

FIG. 9 shows the fiber structure of a carbon fiber composite including carbon fibers oriented to extend predominantly along the longitudinal axis A-A of the filter component, such as in the planes 380 of the filter component 350 shown in FIG. 8.

Alternatively, the carbon fibers of the carbon fiber composite can have different orientations with respect to the longitudinal axis of the filter component than the orientation shown in FIG. 8. For example, FIG. 10 shows a filter component 450 comprising a porous, carbon-bonded carbon fiber composite 452, which includes carbon fibers in planes 480 extending orthogonal to the longitudinal axis A-A of the filter component in the body 454 and also in the covers 466, 468.

Figure 10:
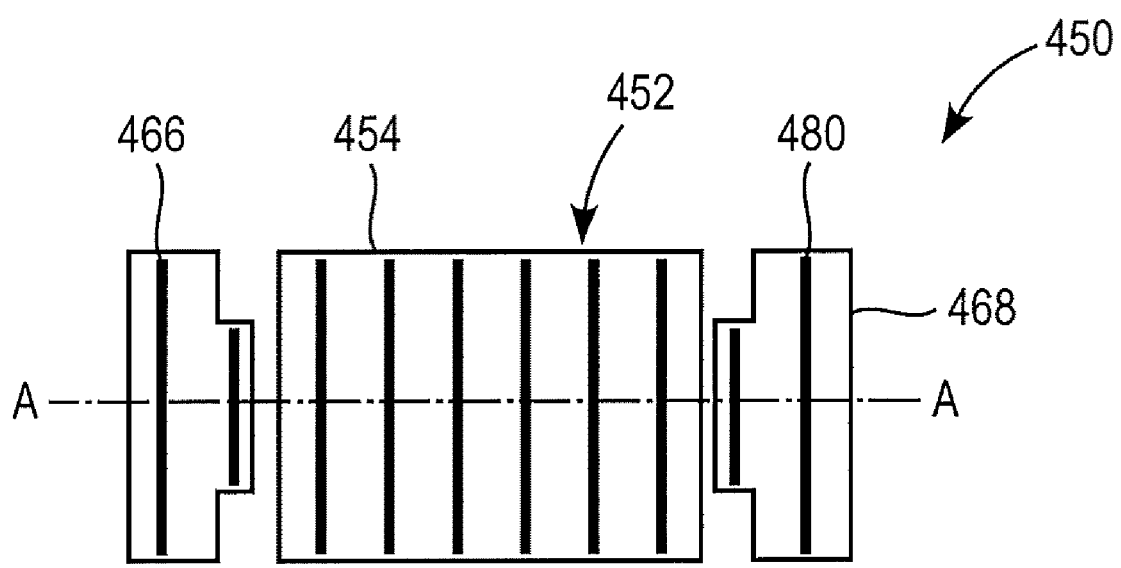
FIG. 10 is a longitudinal cross-sectional view of another embodiment of a carbon-bonded carbon fiber composite including carbon fibers lying substantially in planes extending orthogonal to the longitudinal axis A-A of the composite.
Figure 11:
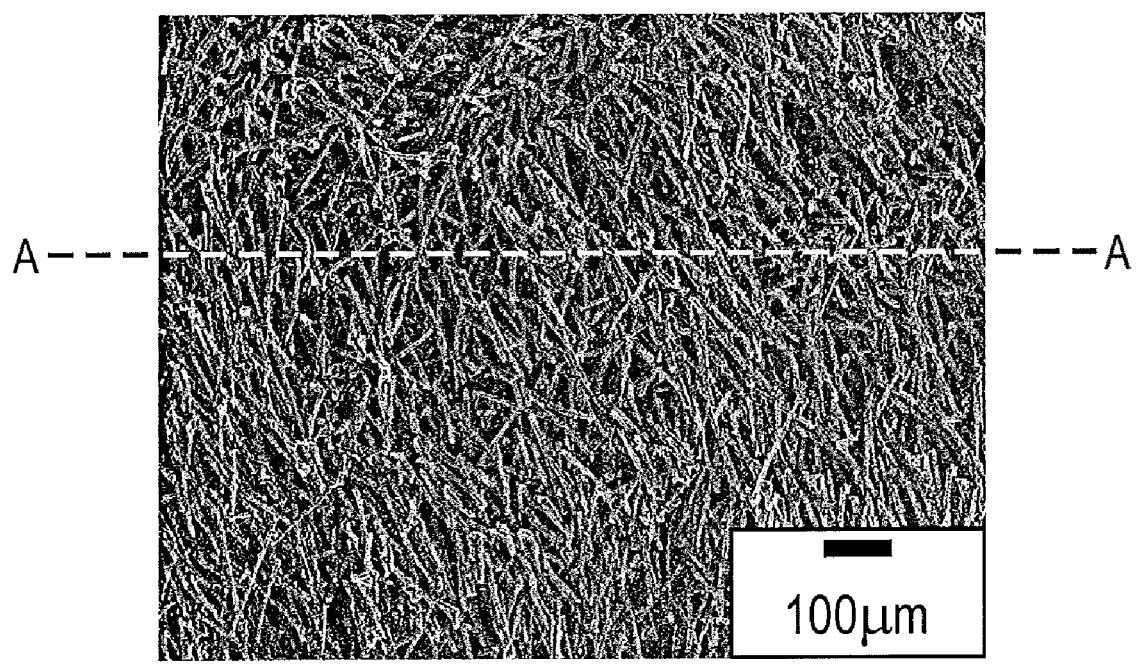
FIG. 11 is photomicrograph of another preferred embodiment of a carbon-bonded carbon fiber composite, which includes carbon fibers lying substantially in planes orthogonal to the longitudinal axis of the composite.

FIG. 11 shows the fiber structure of a carbon fiber composite that includes carbon fibers oriented to extend in a direction predominantly orthogonal to the longitudinal axis A-A of the filter component, such as in the filter component 450 shown in FIG. 10. In the filter component 450, the thermal conductivity of the carbon fibers is highest in the plane 480 of the carbon fibers, i.e., in the direction orthogonal to the longitudinal axis A-A.

Figure 12:
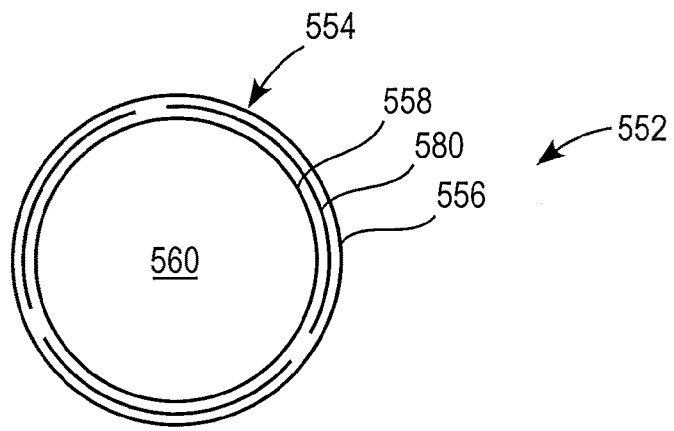
FIG. 12 is a transverse cross-sectional view of another preferred embodiment of the carbon-bonded carbon fiber composite including circumferentially-oriented carbon fibers.

FIG. 12 depicts a body 554 and cavity 560 of a porous, carbon-bonded carbon fiber composite 552 according to another embodiment. The carbon fiber composite 552 includes carbon fibers 580 oriented predominantly in the circumferential direction of the body 554. This orientation of the carbon fibers reduces heat conduction in a radial direction of the body 554 between the inner surface 558 and the outer surface 556, thereby providing for a more uniform circumferential temperature distribution on the outer surface 556 and preferably avoiding "hot spots" on the outer surface 556.

The filter component can have various shapes and sizes. For example, the outer surface of the body of the carbon fiber composite can be cylindrical, square, rectangular, of other polygonal shapes, and the like. The cavity of the body also can have various transverse cross-sectional shapes, such as cylindrical, square, rectangular, other polygonal shapes and the like.

The body of the carbon fiber composite can include a single cavity, or alternatively two or more cavities. The same or different catalyst material can be placed in each cavity. For example, the body can include one, two, or more cylindrical cavities, each containing catalyst material.

The one or more cavities can be located at one or more respective selected locations along the length of the body of the carbon fiber composite. For example, the cavity can be located at the upstream end of the body (i.e., the end closer to the tobacco column) and extend along only a portion of the length of the body in a cigarette. Placing the cavity at such location can increase the length of the body downstream of the catalyst and thereby contain heat further away from the mouth end of the cigarette. The carbon fiber composite can also be located closer to the tobacco column to achieve this effect.

The size of the filter component can be appropriately selected based on the size of the space in the smoking articles in which it is placed. For example, when the filter component is used in a filter of a cigarette, the filter component can be cylindrical and have a length preferably less than about 20 mm, more preferably less than about 15 mm. The outer diameter of the body and cover(s) of the carbon fiber composite is preferably slightly less than the diameter of the cigarette. For example, the outer diameter of the body and cover(s) of the carbon fiber composite can be slightly less than about 8 mm, which is a typical cigarette outer diameter. When the filter component is used in a smoking article other than a cigarette, the filter component can have suitable dimensions for those smoking articles. For example, when used in a cigar, the filter component preferably has a width or diameter slightly less than the width or diameter of the cigar.

The one or more cover(s) of the carbon fiber composite preferably have a thickness along the longitudinal axis A-A that minimizes the pressure drop across the cover(s). For example, the cover configurations shown in FIGS. 1-3 preferably have a maximum thickness of less than about 2 mm, more preferably less than about 1 mm. The covers preferably also have sufficient strength to be mounted to the body of the carbon fiber composite, such as by press fit, bonding, or other suitable mounting technique.

The one or more cavities of the carbon fiber composite can be appropriately sized to hold a suitable amount of catalyst material. For example, the one or more cavities can be sized to contain a total of from about 25 mg to about 200 mg of catalyst material, more preferably from about 50 mg to about 150 mg of catalyst material. In an exemplary embodiment, the body can include a single cylindrical cavity having a diameter of from about 4.5 mm to about 6.5 mm, and a length of from about 10 mm to about 20 mm. The catalyst material volume preferably fills, or at least substantially fills, the one or more cavities in which it is contained, so as to reduce settling of the catalyst, but without presenting an undesirable increase in the resistance to draw (RTD) when utilized in a smoking article.

Figure 13:
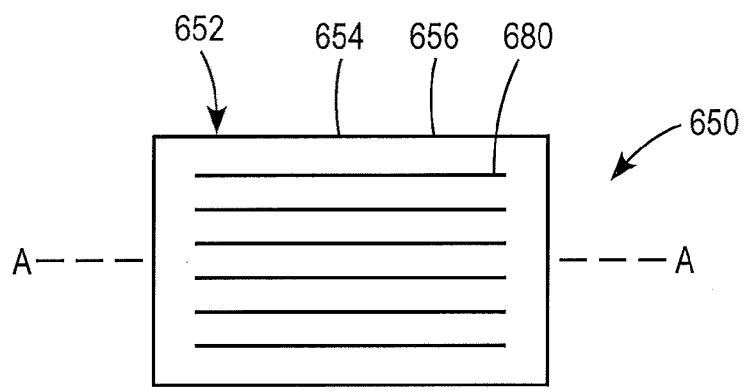
FIG. 13 depicts another preferred embodiment of the carbon-bonded carbon fiber composite having a monolithic structure and including carbon fibers extending along the longitudinal axis of the composite.

However, in other embodiments, the filter component can have a configuration that does not include a cavity for containing the catalyst. For example, FIG. 13 depicts an embodiment of the filter component 650 that has a monolithic structure without a cavity. In the embodiment, the carbon fiber composite 652 includes carbon fibers lying in planes 680 oriented along the longitudinal axis A-A. This orientation of the planes 680 of the carbon fibers reduces heat transfer from the carbon fibers to the outer surface 656. Catalyst material can be provided, e.g., on the carbon fibers, and/or dispersed in voids between carbon fibers by, e.g., mechanically or physically impregnating a slurry containing catalyst material after forming the filter composite. Covalent chemical attachment can also be used.

In such embodiments, the filter component can include a hollow tube or sleeve fitted over the carbon fiber composite 652, where the sleeve does not contain catalyst material so that heat is not generated in the sleeve by chemical reactions catalyzed by catalyst material. The sleeve can provide additional thermal insulation to the filter component.

The monolithic filter component 650 preferably has a sufficiently low density so that it has suitably low resistance to gas flow through the filter component. The filter component 650 can have various outer shapes and sizes, such as shapes having a round or polygonal outer surface. The filter component 650 can be sized based on the size of the space in the smoking article in which it is used.

Figure 14:
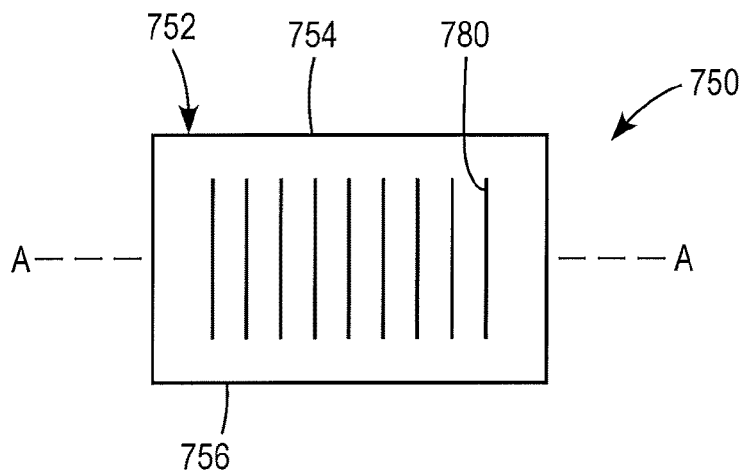
FIG. 14 depicts another preferred embodiment of the carbon-bonded carbon fiber composite having a monolithic structure and including carbon fibers extending orthogonal to the longitudinal axis of the composite.

FIG. 14 depicts a filter component 750 according to another preferred embodiment. The filter component 750 includes a porous, carbon-bonded carbon fiber composite 752 having a monolithic structure. Carbon fibers extend in planes 780 oriented orthogonal to the longitudinal axis A-A of the filter component 750. The carbon fibers are preferably located to reduce heat transfer from the fibers to the outer surface 756. Catalyst material can be provided, e.g., on the carbon fibers and/or dispersed between the carbon fibers.

The catalyst material contained in the filter component can have any suitable composition. The catalyst material can be selected to catalyze the chemical reaction of one or more selected constituents of a gas. For example, the catalyst material preferably is effective to catalyze the oxidation of CO by the following reaction: $2CO+O_2 \rightarrow 2CO_2$. This reaction is strongly exothermic ($\Delta H=-283$ kJ/mole) and thus evolves a large quantity of heat. The catalyst material can also be selected to catalyze other chemical reactions, such as the reduction of nitric oxide (NO) to $N_2$.

Suitable catalysts for the oxidation of carbon monoxide include the cobalt-based catalysts described in commonly-assigned U.S. Pat. No. 5,502,019, which is incorporated herein by reference in its entirety. The cobalt-based catalyst is preferably a binary oxide catalyst of cobalt and manganese. The atomic ratio of cobalt to manganese in the catalyst is preferably from about 15:1 to about 10:1. The cobalt-based catalyst can be another cobalt-based binary or higher order oxide, such as an oxide of cobalt and one or more of the metals Al, Bi, Ce, Cr, Cu, Fe, La, Mg, Ti, Zn and Zr. The cobalt-based catalysts are useful at low temperatures to oxidize carbon monoxide, e.g., at room temperature. The cobalt-based catalysts can be made by methods described in the '019 patent.

Other catalysts that can be used in the filter component to oxidize carbon monoxide, as well as to catalyze other chemical reactions, are the cerium oxide-copper catalysts described in commonly-assigned U.S. Patent Application Publication No. 2004/0110633, which is incorporated herein by reference in its entirety. These catalysts can catalyze oxidation or reduction reactions, such as the oxidation of carbon monoxide, or reduction of nitric oxide.

Additional catalysts that can be used in the filter component include catalysts described in commonly-assigned U.S. Patent Application Publication Nos. 2003/0075193, 2003/0131859, 2004/0007241, 2004/0025895, 2004/0250654, 2004/0250825, 2004/0250827, and in commonly-assigned U.S. Pat. Nos. 6,769,437 and 6,782,892, each of which is incorporated herein by reference in its entirety. The catalysts can include metal particles and/or metal oxide particles including B, Mg, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt, Au and mixtures thereof.

The catalyst particles can be micron-sized particles, nanoscale-sized particles (i.e., have an average particle size less than about 100 nm), or mixtures thereof. Nanoscale particles have a very high surface area to volume ratio, which can enhance their catalytic performance.

The catalyst contained in the cavity of the carbon fiber composite preferably provides a suitably low resistance to gas flow. In a preferred embodiment, the catalyst is an agglomerate of catalyst particles. For example, the agglomerates can have a size of 14 mesh to 20 mesh according to U.S. Standard, ASTM E11 (i.e., a size of 1410 μm to 850 μm, respectively). The catalyst particles can be entirely of catalyst material, or the catalyst particles can be mixed with and/or supported on support material, which may enhance catalytic activity by promoting a favorable orientation or dispersion to increase surface area. In an embodiment, the catalyst particles of the agglomerates can have a size of from about 5 μm to about 30 μm. Such agglomerates have suitably low resistance to gas flow for use in the filter components.

The catalyst support material can be, e.g., the support material described in U.S. Patent Application Publication 2004/0250827. For example, the catalyst support can comprise inorganic oxide particles, such as silica gel beads, molecular sieves (e.g., zeolites), magnesia, alumina, silica, titania, zirconia, iron oxide, cobalt oxide, nickel oxide, copper oxide, yttria optionally doped with zirconium, manganese oxide optionally doped with palladium, ceria and mixtures thereof. Also, the catalyst support can comprise activated carbon particles. The catalyst support can act as a sorbent and/or be catalytically active in the filter component.

As described above, it has been determined that the orientation of carbon fibers having a length of 100 μm to 400 μm relative to the longitudinal axis of the carbon fiber composite affects thermal properties of the carbon fiber composite. FIG. 15 shows the relationship between thermal conductivity and density for carbon fiber composites made from four different lengths of the following carbon fibers (i.e., 380 μm rayon, 200 μm pitch, 150 μm PAN, and 100 μm pitch). In four of the carbon fiber composites, the carbon fibers extend along the longitudinal axis A-A of the filter component, as shown in the upper "in-plane" curve. In four other carbon fiber composites, the same carbon fibers extend orthogonal to the longitudinal axis A-A of the filter component, as shown in the lower "out-of-plane" curve. The carbon fiber composites including the same type of carbon fibers have the same or similar density. As shown, the carbon fiber composites including carbon fibers extending along the longitudinal axis each have a higher thermal conductivity along the longitudinal axis than the carbon fiber composites including carbon fibers of the same material, but which are arranged orthogonal to the longitudinal axis.

The carbon fiber planes in the body and in the cover(s) of the carbon fiber composite can have the same orientation, or a respectively different orientation, relative to the longitudinal axis. In an exemplary embodiment, the carbon fiber planes in the body and in the cover(s) extend along the longitudinal axis (see FIG. 8). In such embodiments, the carbon fiber planes of highest thermal conductivity extend parallel to each other in both the body and cover(s). In another exemplary embodiment, the carbon fiber planes in the body extend either along the longitudinal axis or orthogonal to the longitudinal axis, with the carbon fiber planes in the cover(s) extending in the other of the two directions. In such embodiments, the planes of highest thermal conductivity in the body and covers are orthogonal to each other.

The lengths of the carbon fibers affects mechanical and thermal properties of the carbon fiber composite. FIG. 16 depicts the maximum compressive stress applied to carbon fiber composites before failure of the composites. This maximum compressive stress is defined herein as the "compressive strength" of a carbon fiber composite. The carbon fiber composites that were tested included carbon fibers having lengths of about 100 μm (pitch fibers), about 150 μm (PAN fibers), about 200 μm (pitch fibers), and about 380 μm (rayon fibers), where the carbon fibers are oriented either "in-plane" or "out-of-plane."

As shown, the maximum compressive stress applied to the carbon fiber composites (or compressive strength) decreased as the carbon fiber length increased for both the "in-plane" and "out-of-plane" fiber orientations. The highest and lowest measured maximum compressive stress values correspond to the shortest and longest carbon fiber lengths, respectively. The average in-plane compressive strength for the carbon fiber composites including 100 μm pitch fibers is about 20 MPa, which represents an increase by a factor of about five compared to the average out-of-plane compressive strength for the carbon fiber composites including 380 μm rayon fibers, and also an increase in specific compressive strength (strength/density). For an in-plane carbon fiber orientation, the carbon fiber composite preferably has a compressive strength of from about 5 MPa to at least about 20 MPa. The average out-of-plane compressive strength for the carbon fiber composites including 100 μm pitch fibers is about 10 MPa, which represents an increase by a factor of about eight compared to the average out-of-plane compressive strength for the carbon fiber composites including 380 μm rayon fibers, and also an increase in specific compressive strength (strength/density) by a factor of about four. For an out-of-plane carbon fiber orientation, the carbon fiber composite preferably has a compressive strength of from about 3 MPa to at least about 10 MPa. By increasing the strength of the carbon fiber composites by using shorter fibers, the wear resistance, durability and machineability of the composites can preferably be improved.

FIG. 17 depicts the thermal conductivity versus carbon fiber length for carbon fiber composites including carbon fibers having lengths of about 100 μm (pitch fibers), about 150 μm (PAN fibers), about 200 μm (pitch fibers), and about 380 μm (rayon fibers), where the carbon fibers are oriented either "in-plane" or "out-of-plane." As shown, the in-plane thermal conductivity of the carbon fiber composites including shorter carbon fibers was increased as compared to the composites including rayon fibers. The out-of-plane thermal conductivity is increased by the shorter carbon fibers, but only by less than a factor of two. Accordingly, reducing the length of the carbon fibers provides for increased compressive strength without increasing the thermal conductivity of the carbon fiber composites by an unsuitable amount.

FIG. 18 depicts the thermal conductivity ratio, i.e., the ratio of the in-plane thermal conductivity to the out-of-plane thermal conductivity, for carbon fiber composites including carbon fibers having lengths of about 100 μm (pitch fibers), about 150 μm (PAN fibers), about 200 μm (pitch fibers), and about 380 μm (rayon fibers), where the carbon fibers are oriented either "in-plane" or "out-of-plane." In FIG. 18, the symbols "A" and "B" designate that the respective measurements were made by two different sources. As shown, decreasing the carbon fiber length of the carbon fiber composites reduces the anisotropy of the thermal conductivity, i.e., it decreases the thermal conductivity ratio.

FIG. 19 represents the variation with respect to time of the CO content of gas passed through a filter component containing a Co-based oxide catalyst, and the external temperature of the filter component for a $N_2$-10% $O_2$-6% CO gas. The carbon fiber composites include 150 μm PAN fibers and closed ends. As shown, at even the high internal temperatures of the filter component resulting from oxidation of CO catalyzed by the catalyst, the external temperature of the carbon fiber composite slowly increases, and typically reaches a maximum temperature of less than about 100° C. after about 2 to 3 minutes of continuous gas flow and approximately 100% conversion of CO. For the shorter time period of normal puffing of a cigarette (i.e., about 2 seconds), external temperatures of the filter component are expected to be lower, preferably close to ambient temperature.

Comparative tests were conducted by flowing a CO-containing gas mixture through capsules made from Pitch 100, PAN 150 fibers and Pitch 200 fibers to determine CO conversion and the external temperature reached by the capsules. A Co—Mn (10:1) oxide catalyst was made by co-precipitation, sieved to obtain a 0.8-1.4 mm particle size, and calcined at 250° C. in $O_2$ for 3 hours. About 140 mg of the catalyst was inserted into each of the capsules. The catalyst was initially at room temperature. The gas mixture contained 10% $N_2$/6% $O_2$/6% CO flowing at 1.06 Lpm. The gas mixture was flowed through the capsules for 60 seconds and the external temperature of the capsules that was reached after 60 seconds was measured using a thermocouple. The percent CO conversion was also determined.

The test results are shown in the Table. As shown, a high CO conversion of at least about 97% was achieved for each of the capsules. The external temperatures of the capsules ranged from 64° C. to 71° C.

TABLE

| Capsule Fiber Material | Fiber Plane Direction | CO Conversion (%) | External Temperature After 60 s (° C.) |
|---|---|---|---|
| Pitch 100 | IN | 99.8 | 64 |
| | OUT | 97.1 | 71 |
| PAN 150 | IN | — | — |
| | OUT | 98.0 | 67 |
| Pitch 200 | IN | 96.7 | 64 |
| | OUT | 99.2 | ~66 |

FIG. 20 depicts the variation in the catalyst temperature with respect to the gas flow rate and CO content of a $N_2$-10% $O_2$—CO gas. The carbon fiber composites include 150 μm PAN fibers and have closed ends. As shown, increasing the CO content of the gas increases the catalyst temperature at a given gas flow rate. The catalyst reaches a temperature of about 500° C. at the highest CO content.

FIG. 21 shows the RTD versus carbon fiber composite density for carbon fiber composites made of different carbon fibers. The carbon fiber composites include a tubular body, two open ends and a cover closing each open end. The body and the cover both include the same type of carbon fiber. Curve "A" represents carbon fiber composites including "in-plane" carbon fibers and also a catalyst; curve "B" represents carbon fiber composites including "in-plane" carbon fibers, but no catalyst; curve "C" represents carbon fiber composites including "out-of-plane" carbon fibers and also a catalyst;

and curve "D" represents carbon fiber composites including "out-of-plane" carbon fibers, but no catalyst. As shown, for a given carbon fiber composite density, the RTD values vary between the different carbon fiber composites.

FIG. 22 shows the resistance to draw versus carbon fiber composite density for carbon fiber composites, in which the body includes 100 µm pitch fibers, and the cover includes a different type of carbon fiber. Curve "A" represents carbon fiber composites including "in-plane" carbon fibers and also a catalyst; curve "B" represents carbon fiber composites including "in-plane" carbon fibers, but no catalyst; curve "C" represents carbon fiber composites including "out-of-plane" carbon fibers and also a catalyst; and curve "D" represents carbon fiber composites including "out-of-plane" carbon fibers, but no catalyst. As shown, for a given carbon fiber composite density, the RTD values vary between the different carbon fiber composites.

Comparing the curves in FIGS. 21 and 22, curves C and A in FIG. 22 exhibit lower maximum RTD values than those shown in FIG. 21. Accordingly, by arranging the carbon fibers along the longitudinal axis of the filter component in the body and cover(s), the RTD of the filter component can generally be lowered.

In a preferred embodiment, the filter component is oriented to extend lengthwise along the length dimension of a cigarette or other smoking article. Such orientation of the filter component increases the length of the flow path through the catalyst traversed by mainstream tobacco smoke, thereby exposing the smoke to an increased catalyst surface area. Accordingly, the catalysis of selected constituents of the mainstream tobacco smoke by the catalyst can be increased.

However, increasing the length of the filter component can increase the pressure drop along its length corresponding to a given gas flow rate through the filter component. Because increasing the pressure drop can increase the RTD of the smoking article, in preferred embodiments, the length of the filter component provides for a desirable RTD of the smoking article.

The carbon fiber composite can be made, e.g., by the method described in George C. Wei and J. M. Robbins, "Carbon-Bonded Carbon Fiber Insulation for Radioisotope Space Power Systems," *Ceramic Bulletin*, vol. 64, no. 5, pp. 691-699 (1985), which is incorporated herein by reference in its entirety. The method comprises forming a slurry by mixing carbon fibers with a binder. The slurry can be a water slurry or a non-aqueous slurry. Preferably, water is used to form the slurry because it can be readily removed from the slurry by subsequent processing. For example, carbon fibers and binder particles can be combined to form a water slurry, which is subsequently dried and heated in an oxidizing atmosphere to carbonize the resin.

The carbon fibers are preferably rayon fibers. Alternatively, the carbon fibers can be pitch, PAN or other carbon fibers. Suitable carbon fibers are commercially available from Ashland Petroleum Company, located in Ashland, Ky., and from Anshan East Asia Carbon Company, located in Anshan, China.

According to a preferred embodiment, the binder is an organic material that can be carbonized by heating, i.e., a carbonizable organic material. The binder is a carbon-bond precursor. For example, the binder can be pitch, thermosetting resin or phenolic resin. Preferably, the binder is a phenolic resin, which is water-soluble and provides a suitably high carbon yield when carbonized. The phenolic resin is preferably in powder form. The carbon fibers and the binder are mixed in a suitable ratio. Preferably, the ratio of the carbon fibers to resin (on a weight basis) is from about 2:1 to about 4:1.

The slurry is formed into a shaped body having the configuration that is desired for the carbon fiber composite, preferably a cylinder or disc. In a preferred embodiment, slurry is formed into a shaped body by a vacuum molding process, such as the process described by George C. Wei and J. M. Robbins, which orients the carbon fibers in a preferred direction in the body.

According to the embodiment, after vacuum molding, the molded form is dried. The dried form is removed from the mold and cured. The curing process cross-links the binder. The curing temperature is selected based on factors including the binder composition. For example, for a phenolic resin binder, the form is cured in an air or other suitable atmosphere at a preferred temperature of from about 130° C. to about 150° C. The cured carbon fiber composite has a monolithic structure.

According to the embodiment, the cured carbon fiber composite is carbonized. In this step, the cured carbon fiber composite is heated at a selected temperature and for an effective amount of time to sufficiently carbonize the binder. For example, the carbon fiber composite can be heated at a temperature of about 600° C. to about 700° C. in an inert gas atmosphere to carbonize phenolic resin.

The resulting carbonized monolithic carbon fiber composite can be machined to form one or more cavities at one or more selected locations. The cavities can be formed, e.g., by drilling the monolithic body. For example, at least one cavity can extend completely through the body, such as shown in FIG. 1, or alternatively can extend partially through the body, such as shown in FIG. 3, so that the body includes an open end and an opposite closed end. As described above, the cavity can extend along only a portion of the length of the body, such as less than about ¼, less than ½, or less than about ¼ of the body length. The covers can be formed by slicing segments having a suitable length from the monolithic body and machining the segments to form covers of a desired shape and size.

However, in another preferred embodiment, the resulting carbonized monolithic carbon fiber composite does not include a cavity. In such embodiment, the catalyst material can be incorporated in the body of the carbon fiber composite during manufacture of the carbon fiber composite, e.g., by including the catalyst in the slurry. Alternatively, catalyst material can be impregnated into the body of the carbon fiber composite following manufacture of the carbon fiber composite. In such embodiment, the carbon fiber composite preferably has a disc configuration and preferably has a length of from about 3 mm to about 20 mm. One or more discs can be provided in a filter. As described above, a sleeve that does not also contain catalyst can be provided on the outer surface of the body.

In a preferred embodiment, the filter component is incorporated in the filter portion of a smoking article. The filter component can be incorporated in one or more locations in the filter portion. The filter component can also be used in various filter constructions.

In another embodiment, the filter component can be used in combination with at least one flavoring-release additive, such as described in commonly-assigned U.S. Application Publication No. 2004/0129280, which is incorporated herein by reference in its entirety. The flavoring-release additive can be disposed downstream from the filter component in a cigarette, for example.

The flavoring-release additive can include one or more flavorings, such as menthol, mint, e.g., peppermint or spearmint, chocolate, licorice, citrus and other fruit flavors, gamma octalactone, vanillin, ethyl vanillin, breath freshener flavors, spice flavors, such as cinnamon, methyl salicylate, linalool, bergamot oil, geranium oil, lemon oil, ginger oil and tobacco flavor.

The flavoring is encapsulated by an encapsulating material that protects the flavoring from exposure to undesired substances in the cigarette and atmosphere, and substantially prevents the flavoring from being released until the flavoring-release additive is heated to the flavoring-release temperature during smoking of the cigarette. Consequently, the flavoring is preferably substantially prevented from migrating in the cigarette and from reacting with other substances in the cigarette or with the environment.

As described above, exothermic reactions that can be catalyzed by the catalyst of the filter component, such as the oxidation of CO, evolve a large amount of heat. In a preferred embodiment, the evolved heat is utilized to heat the flavoring release additive to the flavoring release temperature during smoking of a cigarette, thereby releasing the flavoring in the filter downstream from the filter component.

The flavoring-release additive can have different structures and compositions. In one preferred embodiment, the flavoring-release additive is in the form of beads. The beads preferably encapsulate the flavoring and provide for controlled release of the flavoring in a cigarette during puff cycles. The beads preferably comprise at least one encapsulating material and at least one flavoring. The encapsulating material preferably comprises a binder, which can be, e.g., one or more of palm oil, konjac gum, xylitol, zein, hydroxypropylcellulose, sorbitol, maltitol and hydroxypropylmethylcellulose. Depending on the composition of the beads, the minimum temperature at which the beads release the flavoring can be adjusted. Beads comprising one or more of the above-described binders preferably have a minimum temperature at which the flavoring is released of at least about 40° C., such as about 40° C. to about 150° C. Cigarettes preferably comprise an amount of the beads that provides a desired amount of the flavoring in the cigarette.

In another preferred embodiment, the flavoring-release additive includes a film. The film preferably encapsulates the flavoring and enables the controlled temperature release of the flavoring in a cigarette during smoking. The film-type flavoring-release additive preferably comprises at least one encapsulating material and at least one flavoring. A film comprising one or more of the above-described binders preferably has a minimum temperature at which the flavoring is released of at least about 50° C., such as up to about 120° C. Cigarettes preferably comprise an amount of the film that releases a desired amount of the flavoring during smoking of the cigarette.

In another preferred embodiment, the flavoring-release additive is an inclusion complex. The inclusion complex comprises a "host molecule," and the flavoring is the "guest molecule" in the inclusion complex. The inclusion complex provides for controlled release of the flavoring in the cigarette during smoking. In a preferred embodiment, the flavoring is a lipophilic organic flavoring, which preferably concentrates within a hydrophobic cavity of the host molecule. Suitable flavorings include, but are not limited to, menthol, mint, such as peppermint and spearmint, chocolate, licorice, citrus and other fruit flavors, gamma octalactone, vanillin, ethyl vanillin, breath freshener flavors, spice flavors, such as cinnamon, methyl salicylate, linalool, bergamot oil, geranium oil, lemon oil, ginger oil and tobacco flavor.

The host molecule of the inclusion complex is preferably a cyclodextrin. More preferably, the inclusion complex comprises beta-cyclodextrin, which can desirably accommodate a wide variety of guest molecules and is readily available. The minimum temperature at which the inclusion complex comprising a cyclodextrin releases the flavoring is preferably at least about 60° C., such as from about 60° C. to about 125° C. Cigarettes preferably comprise an amount of the inclusion complex that provides a desired amount of the flavoring in the cigarette.

FIGS. 23 and 24 illustrate cigarettes 2 including different exemplary filter constructions in which the filter component (and an optional flavoring-release additive) can be incorporated. In each of these embodiments, more than one filter component can be incorporated in the cigarette filter.

FIG. 23 illustrates a cigarette 2 including a tobacco column 4, a filter portion 6, and a mouthpiece filter plug 8. The filter component can be incorporated, e.g., in place of the folded paper 10, which is disposed in the hollow interior of a free-flow sleeve 12 forming part of the filter portion 6.

FIG. 24 shows a cigarette 2 including a tobacco column 4 and a filter portion 6 in the form of a plug-space-plug filter including a mouthpiece filter 8, a plug 16, and a space 18. The plug 16 can comprise a tube or solid piece of material, such as polypropylene or cellulose acetate fibers. The tobacco column 4 and the filter portion 6 are joined together with tipping paper 14. The filter portion 6 can include a filter overwrap 11. The filter component can be incorporated, e.g., in place of the plug 16 and/or in the space 18.

In another embodiment, the filter component can be placed in the filter portion of a cigarette for use with an electrical smoking device. "Non-traditional" cigarettes include cigarettes for electrical smoking systems, such as described in commonly-assigned U.S. Pat. Nos. 6,026,820; 5,988,176; 5,915,387; 5,692,526; 5,692,525; 5,666,976 and 5,499,636, each of which is incorporated herein by reference in its entirety.

FIG. 25 illustrates an embodiment of a cigarette 100, which can be used with an electrical smoking device. As shown, the cigarette 100 includes a tobacco column 61 and a filter portion 63 joined by tipping paper 65. The filter portion 63 contains a tubular free-flow filter element 102 and a mouthpiece filter plug 104. The free-flow filter element 102 and mouthpiece filter plug 104 can be joined together as a combined plug 110 with a plug wrap 112. The tobacco column 61 can have various forms incorporating one or more of an overwrap 71, another tubular free-flow filter element 74, a cylindrical tobacco plug 80 preferably wrapped in a plug wrap 84, a tobacco web 67 comprising a base web 69 and tobacco flavor material 70, and a void 91. The free-flow filter element 74 provides structural definition and support at the tipped end 73 of the tobacco column 61. At the free end 78 of the tobacco column 61, the tobacco web 67 and an overwrap 71 are wrapped about a cylindrical tobacco plug 80. Various modifications can be made to a filter arrangement for such a cigarette incorporating the filter component.

The filter component can be placed at one or more locations of the filter portion 63 of the cigarette 100. For example, the filter component can replace the tubular free-flow filter element 102, the free-flow filter element 74 and/or be placed in the void space 91.

In the embodiments of the cigarettes shown in FIGS. 23-25, an optional flavoring-release additive can be placed downstream from the filter component(s).

An exemplary embodiment of a method of making a filter comprises incorporating a filter component (and an optional flavoring-release additive) into a cigarette filter. The catalyst can catalyze the chemical reaction of one or more selected components of mainstream tobacco smoke. Any conventional or modified method of making cigarette filters may be used to incorporate the filter component in the cigarette.

Embodiments of methods for making cigarettes comprise placing a paper wrapper around a tobacco column, and attaching a cigarette filter to the tobacco column to form the cigarette. The cigarette filter contains the filter component.

Examples of suitable types of tobacco materials that may be used include flue-cured, Burley, Md. or Oriental tobaccos, rare or specialty tobaccos and blends thereof. The tobacco material can be in the form of tobacco lamina; processed tobacco materials, such as volume expanded or puffed tobacco, processed tobacco stems, such as cut-rolled or cut-puffed stems, reconstituted tobacco materials, or blends thereof. Tobacco substitutes may also be used.

In cigarette manufacture, the tobacco is normally in the form of cut filler. The cigarettes may further comprise one or more flavorants or other additives (e.g., burn additives, combustion modifying agents, coloring agents, binders and the like).

Known techniques for cigarette manufacture may be used to incorporate the filter component. The resulting cigarettes can be manufactured to any desired specification using standard or modified cigarette making techniques and equipment. The cigarettes may range from about 50 mm to about 120 mm in length. The circumference is from about 15 mm to about 30 mm, and preferably around 25 mm.

Other preferred embodiments provide methods of smoking a cigarette described above. "Smoking" of a cigarette means the heating or combustion of the cigarette to form tobacco smoke. Generally, smoking of a cigarette involves lighting one end of the cigarette and drawing the cigarette smoke through the mouth end of the cigarette, while the tobacco contained in the tobacco column undergoes a combustion reaction. Smoke is drawn through the cigarette. During the smoking of the cigarette, the catalyst of the filter component catalyzes the chemical reaction of one or more selected constituents of mainstream smoke.

However, the cigarette may also be smoked by other means. For example, the cigarette may be smoked by heating the cigarette and/or heating using an electrical heater, as described, e.g., in commonly-assigned U.S. Pat. No. 6,053,176; 5,934,289; 5,591,368 or 5,322,075, each of which is incorporated herein by reference in its entirety. In another embodiment, the cigarette may include a combustible heat source separate from a bed of tobacco, such as described in commonly-assigned U.S. Pat. No. 4,966,171.

While the invention has been described in detail with reference to preferred embodiments thereof, it will be apparent to one skilled in the art that various changes can be made, and equivalents employed, without departing from the scope of the invention.

What is claimed is:

1. A cigarette filter, comprising:
    a filter component including:
        a porous, carbon-bonded carbon fiber composite; and
    a catalyst contained in the composite, the catalyst being effective to catalyze the chemical reaction of at least one selected constituent of mainstream tobacco smoke in the cigarette filter wherein the carbon fiber composite has a disc configuration without a cavity and the catalyst is dispersed throughout the disc.

2. The cigarette filter of claim 1, further comprising a thermally insulate sleeve surrounding the disc, the sleeve not containing the catalyst.

3. The cigarette filter of claim 1, wherein the catalyst comprises nanoscale-sized particles.

4. A cigarette, comprising:
    a cigarette filter according to claim 1; and
    a tobacco column attached to the cigarette filter.

5. The cigarette of claim 4, which is an electrically heated cigarette or a cigarette including a combustible fuel element.

6. The cigarette of claim 4, including a flavoring-release additive downstream from the filter component in the cigarette filter, the flavoring-release additive including at least one flavoring which is releasable in the cigarette when the flavoring-release additive is heated to at least a minimum temperature in the cigarette.

7. The cigarette of claim 6, wherein the catalyst is effective to catalyze at least the oxidation the CO, and sufficient heat is evolved during the oxidation of the CO to heat the flavoring-release additive to at least the minimum temperature such that the at least one flavoring is released in the cigarette.

8. The cigarette of claim 4, wherein the catalyst comprises nanoscale-sized particles.

9. A method of manufacturing a cigarette filter, comprising incorporating at least one filter component according to claim 1 in a filter.

10. A method of manufacturing a cigarette, comprising:
    placing a paper wrapper around a tobacco column; and
    attaching the cigarette filter according to claim 1 to the tobacco column to form the cigarette.

11. A method of treating mainstream tobacco smoke, comprising heating or lighting the cigarette according to claim 4 to form smoke and drawing the smoke through the cigarette, the catalyst catalyzing the chemical reaction of at least one gaseous constituent included in the smoke.

* * * * *